(12) United States Patent
Kim et al.

(10) Patent No.: US 8,564,746 B2
(45) Date of Patent: Oct. 22, 2013

(54) COLOR FILTER SUBSTRATE, METHOD OF MANUFACTURING THE SAME, AND DISPLAY PANEL USING THE COLOR FILTER SUBSTRATE

(75) Inventors: Do-Hoon Kim, Yongin (KR); Warrick So, Yongin (KR); Dong-Gyu Kim, Yongin (KR)

(73) Assignee: Samsung Display Co., Ltd. (KR)

( * ) Notice: Subject to any disclaimer, the term of this patent is extended or adjusted under 35 U.S.C. 154(b) by 176 days.

(21) Appl. No.: 13/070,381

(22) Filed: Mar. 23, 2011

(65) Prior Publication Data

US 2012/0099055 A1 Apr. 26, 2012

(30) Foreign Application Priority Data

Oct. 25, 2010 (KR) .................. 10-2010-0104243

(51) Int. Cl.
*G02F 1/1335* (2006.01)
*G02F 1/1333* (2006.01)

(52) U.S. Cl.
USPC .................... 349/106; 349/110; 359/891

(58) Field of Classification Search
USPC .................... 349/106, 110; 359/891
See application file for complete search history.

(56) References Cited

U.S. PATENT DOCUMENTS

| | | | |
|---|---|---|---|
| 2001/0007487 A1 | 7/2001 | Yoon et al. | |
| 2002/0090494 A1* | 7/2002 | Song | 428/167 |
| 2002/0176040 A1* | 11/2002 | Lim et al. | 349/113 |
| 2003/0104291 A1 | 6/2003 | Yi et al. | |
| 2003/0133055 A1* | 7/2003 | Um et al. | 349/43 |
| 2005/0118517 A1 | 6/2005 | Yi et al. | |
| 2005/0140916 A1 | 6/2005 | Kume et al. | |
| 2005/0162598 A1* | 7/2005 | Choi et al. | 349/139 |
| 2005/0195353 A1 | 9/2005 | Park et al. | |
| 2006/0215081 A1* | 9/2006 | Song et al. | 349/107 |
| 2009/0201454 A1 | 8/2009 | Kume et al. | |
| 2009/0251645 A1 | 10/2009 | Yoon et al. | |

FOREIGN PATENT DOCUMENTS

| | | |
|---|---|---|
| JP | 2003-227919 | 8/2003 |
| KR | 20000028035 | 5/2000 |
| KR | 1020010084456 A | 9/2001 |
| KR | 20050055608 | 6/2005 |
| KR | 20050092851 | 9/2005 |
| KR | 1020070060485 A | 6/2007 |
| KR | 1020080001190 A | 1/2008 |
| KR | 1020080064484 A | 7/2008 |

* cited by examiner

*Primary Examiner* — Michael Caley

(74) *Attorney, Agent, or Firm* — Knobbe Martens Olson & Bear LLP

(57) ABSTRACT

A color filter substrate, a method of manufacturing the same, and a display panel using the color filter substrate are disclosed. The color filter substrate includes a substrate in which pixel areas are defined, color filters formed on the pixel areas and including first holes therein, a common electrode surrounding upper surfaces and sides of the color filters and including second holes to correspond to the first holes, and first black matrices formed in the first holes.

13 Claims, 5 Drawing Sheets

COLOR FILTER SUBSTRATE, METHOD OF MANUFACTURING THE SAME, AND DISPLAY PANEL USING THE COLOR FILTER SUBSTRATE

CROSS-REFERENCE TO RELATED APPLICATIONS

This application claims the benefit of Korean Patent Application No. 10-2010-0104243, filed on Oct. 25, 2010, in the Korean Intellectual Property Office, the disclosure of which is incorporated herein in its entirety by reference.

BACKGROUND

1. Field

The present disclosure relates to a color filter substrate, a method of manufacturing the same, and a display panel using the color filter substrate.

2. Description of the Related Technology

In general, liquid crystal display devices include a liquid crystal display panel for displaying an image, a backlight assembly for providing light to the liquid crystal display panel, and a container for accommodating the liquid crystal display panel and the backlight assembly therein.

A vertical alignment mode liquid crystal display panel, in which a major axis of liquid crystal molecules is arranged to be perpendicular to a thin film transistor substrate and a color filter substrate while a magnetic field is not applied thereto, has been highlighted from among liquid crystal display panels due to its large contrast ratio and wide viewing angles. In order to realize a wide viewing angle, a cut pattern and a protrusion may be formed in an electrode. A wide viewing angle may be secured by forming a fringe field and uniformly distributing a direction in which liquid crystal inclines. A patterned vertical alignment (PVA) mode, in which a cut pattern is formed in an electrode, is recognized as wide viewing angle technology that may be replaced with an in plane switching (IPS) mode.

SUMMARY OF CERTAIN INVENTIVE ASPECTS

The present disclosure provides a method of manufacturing a color filter substrate, in which a cut portion is formed in a common electrode without forming an over coat film during a patterning process, a color filter substrate manufactured by using the method, and a display panel using the color filter substrate.

According to one aspect, there is provided a color filter substrate including: a substrate in which pixel areas are defined, color filters formed on the pixel areas and including at least one first hole therein, a common electrode surrounding upper surfaces and sides of the color filters and including at least one second hole to align with the at least one first hole; and a first black matrix formed in each of the first holes.

According to another aspect, there is provided a method of manufacturing a color filter substrate, the method including: forming a plurality of first black matrices spaced apart from each other on a substrate, forming color filters including a plurality of first holes by forming color resists on the first black matrices and the substrate, and by patterning each of the first holes to expose each of the first black matrices, and forming a plurality of second holes in a common electrode to correspond to the first holes after forming the common electrode on the first black matrices, the color filters, and the substrate.

According to another aspect, there is provided a display panel including: a thin film transistor (TFT) substrate on which pixel electrodes and TFTs are formed, a color filter substrate facing the TFT substrate configured to provide a space for a liquid crystal layer, and a sealing member interposed between the TFT substrate and the color filter substrate configured to seal the liquid crystal layer, where the color filter substrate includes: a substrate in which pixel areas are defined, color filters formed on the pixel areas and including a plurality of first holes therein, a common electrode surrounding upper surfaces and sides of the color filters and including a plurality of second holes to align with the first holes, and a plurality of first black matrices formed in the first holes.

BRIEF DESCRIPTION OF THE DRAWINGS

The above and other features and advantages will become more apparent by describing in detail exemplary embodiments with reference to the attached drawings in which.

DETAILED DESCRIPTION OF CERTAIN INVENTIVE EMBODIMENTS

Hereinafter, one or more embodiments will be described more fully with reference to the accompanying drawings.

A cut portion of a PVA-mode liquid crystal display panel in a mobile device, for example, in a small and medium sized product, is typically formed in a common electrode of a color filter substrate that corresponds to a center part of a pixel electrode formed in a pixel area defined in an area where a gate line crosses with a data line. In order to form the cut portion, the common electrode is typically formed and then, a photosensitive film may be coated, developed, and etched. Thus, various processes may be added. Also, while the cut portion is formed in the common electrode, an over coat film may be formed to protect the color filter.

Figure 1:
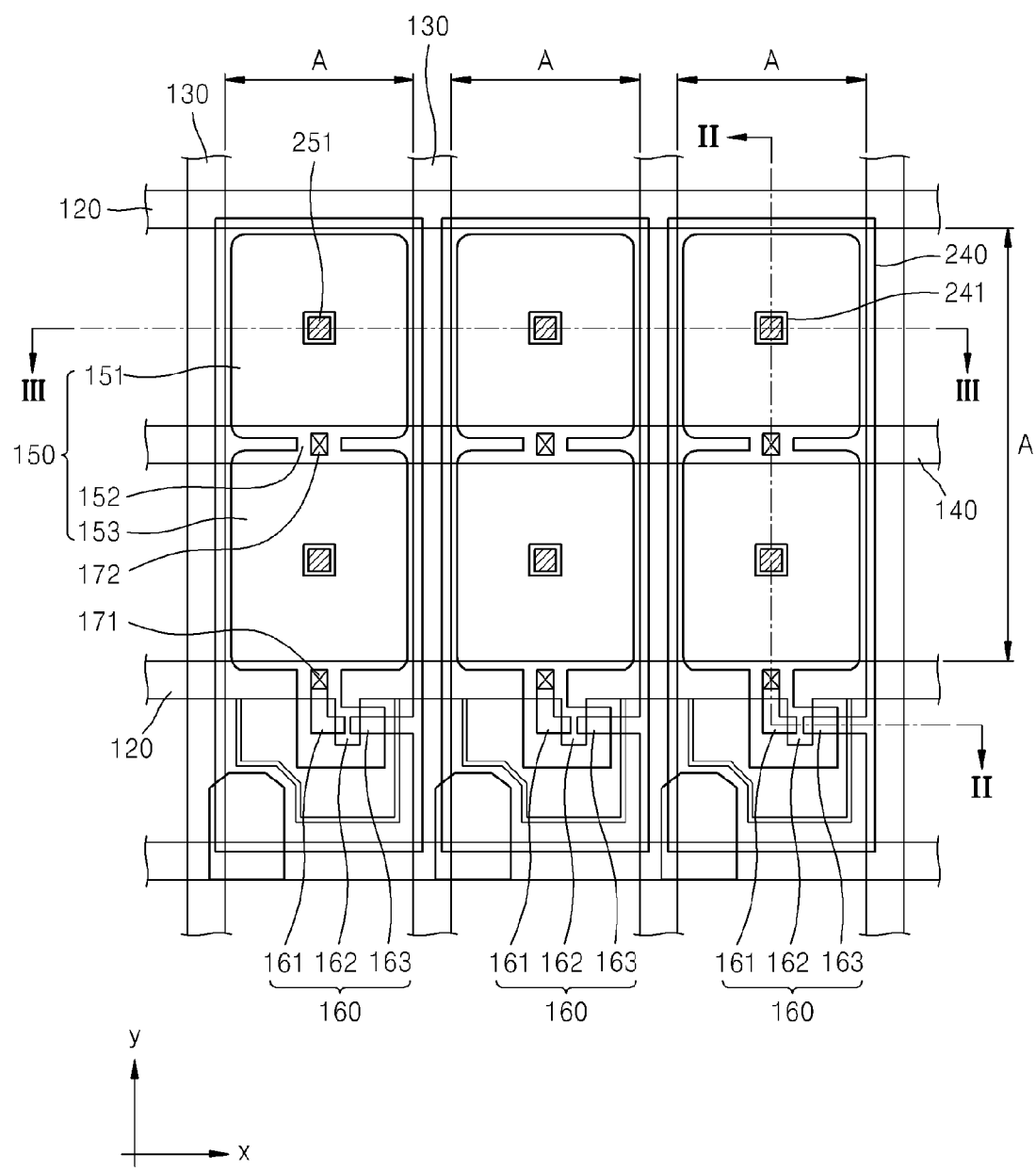
FIG. 1 is a front view schematically illustrating an embodiment of a display panel.
Figure 2:
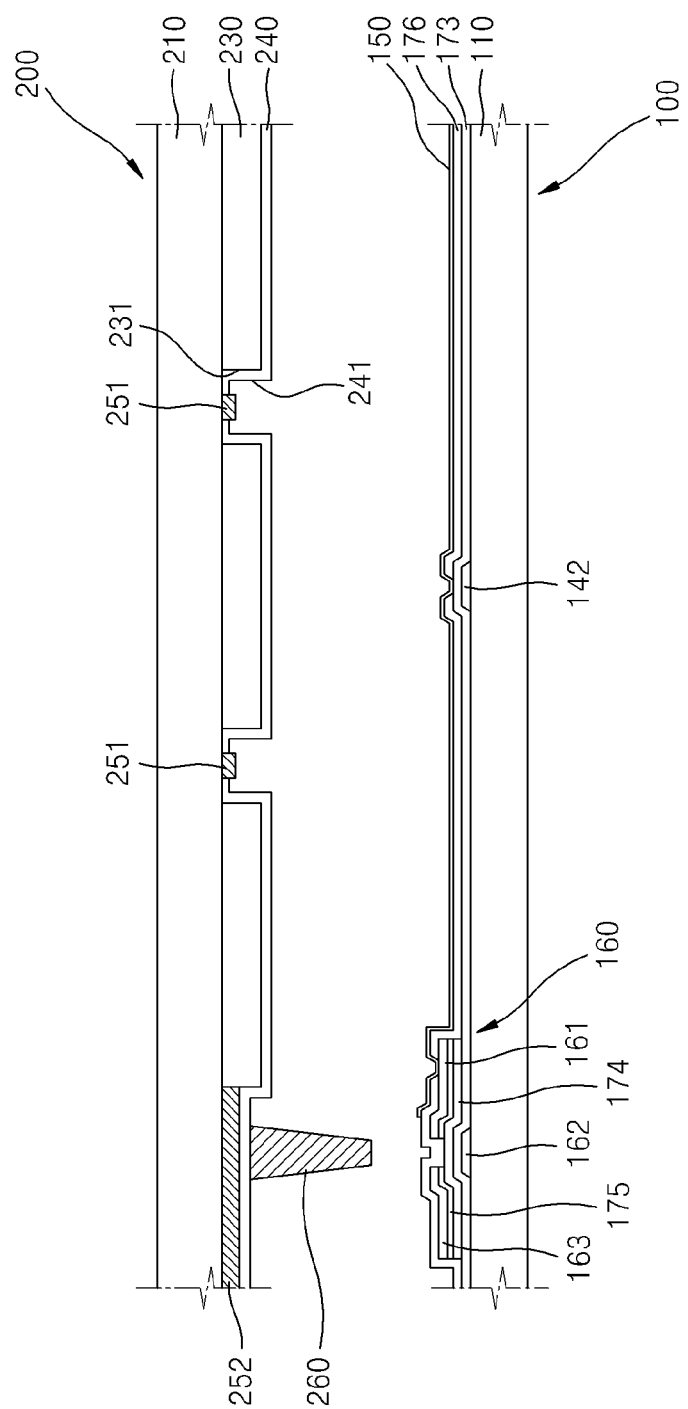
FIG. 2 is a cross-sectional view of the display panel of FIG. 1 taken along a line of II-II of FIG. 1.
Figure 3:
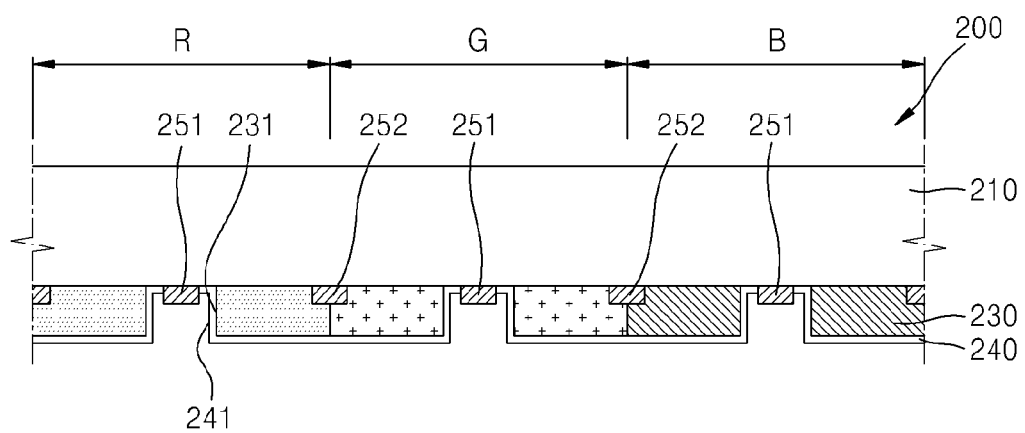
FIG. 3 is a cross-sectional view of the display panel of FIG. 1 taken along a line of III-III of FIG. 1.

FIG. 1 is a front view schematically illustrating an embodiment of a display panel, FIG. 2 is a cross-sectional view of the display panel of FIG. 1, taken along a line of II-II of FIG. 1, and FIG. 3 is a cross-sectional view of the display panel of FIG. 1, taken along a line of III-III of FIG. 1.

Referring to FIGS. 1 through 3, an embodiment of the display panel includes a color filter substrate 200, a thin film transistor (TFT) substrate 100, and a liquid crystal layer (not illustrated) interposed between the color filter substrate 200 and the TFT substrate 100.

The TFT substrate 100 includes a plurality of gate lines 120, a plurality of data lines 130, and pixel electrodes 150. The plurality of gate lines 120 are formed extending in one direction on a first substrate 110, the plurality of data lines 130 are formed extending in a direction perpendicular to that of the plurality of gate lines 120, and the plurality of pixel electrodes 150 are formed on pixel areas A defined by the plurality of gate lines 120 and the plurality of data lines 130. Storage lines 140, including storage electrodes 142 formed passing the center part of the pixel areas A, are formed when the plurality of gate lines 120 are formed.

The plurality of gate lines 120 extend in one direction (x-direction in FIG. 1) and are spaced apart from each other by a predetermined interval. The plurality of gate lines 120 partially protrude to form gate electrodes 162. The gate electrodes 162 are partially overlapped with source electrodes 163 and drain electrodes 161.

The plurality of gate lines 120 may each include at least one metal selected from the group consisting of aluminum (Al), silver (Ag), neodymium (Nd), chromium (Cr), titanium (ti), tantalum (Ta), and molybdenum (Mo). The plurality of gate lines 120 may each have a single-layered structure or a multi-layered structure including a plurality of metal layers. In embodiments where the gate lines 120 have a multi-layered structure, a double-layer including a metal layer formed of chromium (Cr), titanium (ti), tantalum (Ta), or molybdenum (Mo) and a metal layer formed of aluminum (Al) or silver (Ag), each having a different resistance may be included.

The plurality of data lines 130 extend in another direction (y-axis in FIG. 1) and are spaced apart from each other by a predetermined interval. The plurality of data lines 130 partially protrude to form the source electrodes 163. The source electrodes 163 are partially overlapped with the gate electrodes 162 and the drain electrodes 161.

The data lines 130 may include metals used in the gate lines 120 and may have a single-layered structure or a multi-layered structure.

The pixel electrodes 150 are formed on the pixel areas A defined by the gate lines 120 and the data lines 130. Each pixel electrode 150 includes first sub-pixel electrode 151 and second sub-pixel electrode 153 that are spaced apart from each other by a predetermined interval, and a connection unit 152 for electrically connecting the first and second sub-pixel electrodes 151 and 153 to each other.

The first and second sub-pixel electrodes 151 and 153 may have a square-shaped structure in which corners thereof are rounded. The second sub-pixel electrode 153 may be connected to the drain electrode 161 through a contact hole 171. Openings (not illustrated) may be formed in the centers of the first and second sub-pixel electrodes 151 and 153.

The first and second sub-pixel electrodes 151 and 153 and the connection unit 152 may each be formed of a transparent conductive material, for example, indium tin oxide (ITO) or indium zinc oxide (IZO).

In the embodiment of FIG. 1, the pixel electrode 150 is divided into two. In other embodiments, the pixel electrode 150 may be divided into three. Also, the pixel electrode 150 of FIG. 1 has a square-shaped form; in other embodiments, the pixel electrode 150 may be formed as a sphere or a polygon.

The storage lines 140 include storage electrodes 142 and are simultaneously formed with the gate lines 120. The storage lines 140 are each interposed between two adjacent gate lines 120 and, in some embodiments, may be formed to pass the connection unit 152 between the first sub-pixel electrode 151 and the second sub-pixel electrode 153. The storage electrode 142 and the connection unit 152, through a contact hole 172, with a gate insulation layer 173 interposed therebetween, constitute a storage capacitor.

A TFT 160 includes the gate electrode 162 connected to the gate line 120, the source electrode 163 connected to the data line 130, and the drain electrode 161 connected to the pixel electrode 150. Also, the gate insulation layer 173, an activation layer 174, and an ohmic contact layer 175 formed on at least part of the activation layer 174 are sequentially formed between the gate electrode 162, the source electrode 163, and the drain electrode 161. In some embodiments, the ohmic contact layer 175 may be formed on the activation layer 174 except for a channel region.

The structures of the storage electrode 142, the TFT 160, and various wirings illustrated in FIG. 1 are only examples and embodiments are not particularly restricted thereto.

A protective layer 176 is formed on the TFT 160. The protective layer 176 may be formed of an inorganic material, such as oxide silicon or nitride silicon. In other embodiments, the protective layer 176 may be formed of an organic insulation layer or a double-layer including organic/inorganic insulation layers.

The color filter substrate 200 includes first black matrices 251 and second black matrices 252, colors filters 230 and a common electrode 240. The black matrices 251 and 252 are spaced apart from each other by a predetermined interval on a second substrate 210. The color filters 230 have first holes 231 formed in them, and the common electrode 240 surrounds the upper parts and sides of the color filters 230 and includes second holes 241. The first black matrices 251 are formed in the first holes 231 each formed in the color filters 230 realizing the same color. The second black matrices 252 are formed between adjacent color filters 230 each realizing different colors or formed at the edges of the pixel areas.

The first black matrices 251 increase visibility of a color realized in the corresponding pixel areas, and the second black matrices 252 prevent light interference between the adjacent pixel areas A and prevent light from leaking to areas other than the pixel areas A.

The color filters 230 provide colors to light irradiated from an optical source and passing through the liquid crystal layer. The color filters 230 are formed of a photosensitive organic material. In the color filter 230, a red filter R, a green filter G, and a blue filter B are repeatedly formed in each pixel area A with the second black matrices 252 as boundaries. In each color filter 230 where the same color is realized, the first holes 231 are formed. As the first holes 231 are formed in the color filter 230, the volume of the color filter 230 is the same as that of a general color filter so that the color may be uniformly maintained without deteriorating color reproduction. The first black matrices 251 are formed in the first holes 231 so as to increase visibility of a color realized by the color filter 230.

The common electrode 240 is formed to surround the upper surfaces and sides of the color filters 230. The common electrode 240 may be formed of a transparent conductive material, for example, indium tin oxide (ITO) or indium zinc oxide (IZO). The common electrode 240 applies voltage to the liquid crystal layer.

As the common electrode 240 is formed to surround the upper surfaces and sides of the color filters 230, in which the first holes 231 are formed, the common electrode 240 may have effects as holes are formed in the common electrode 240. Second holes 241 having the same size as the first holes 231 or a smaller size than the first holes 231 are formed by patterning the common electrode 240. The common electrode 240 directly contacts the upper surfaces and sides of the color filters 230. Accordingly, unlike a general common electrode, an over coat film interposed between the color filter 230 and the common electrode 240 may not be needed to protect the color filter 230 while forming the second holes 241 in the common electrode 240. Accordingly, a manufacturing cost may be reduced and the process may be simplified.

The first holes 231 formed in the color filters 230 are formed to correspond to the second holes 241 formed in the common electrode 240, and the first and second holes 231 and 241 have the same size. In some embodiments, sizes of the second holes 241 may be smaller than those of the first holes 231.

Sizes of the first black matrices 251 may be larger than or the same as the second holes 241. In the drawings, external widths of the first black matrices 251 formed in the first holes 231 match with the internal diameters of the second holes 241. In the embodiments illustrated, the sizes of the first black matrices 251 are the same as the sizes of the second holes 241. If the sizes of the first black matrices 251 are larger than the sizes of the second holes 241, when a gap is formed between the common electrode 240 and the first black matrices 251, operation of the liquid crystal layer (not illustrated) disposed close to the gap may be adversely affected and thus the gap may not be formed between the common electrode 240 and the first black matrices 251. Although not illustrated, if the gap is not formed between the first black matrices 251 and the second holes 241, for example, if the sizes of the second holes 241 are smaller than those of the first black matrices 251, and the common electrode 240 may be extended to the sides or upper surfaces of the first black matrices 251.

Hereinafter, a method of manufacturing the color filter substrate 200 will be described in detail with reference to FIGS. 4 through 7.

FIGS. 4 through 7 are cross-sectional views illustrating an embodiment of a method of manufacturing the color filter substrate 200.

Figure 4:
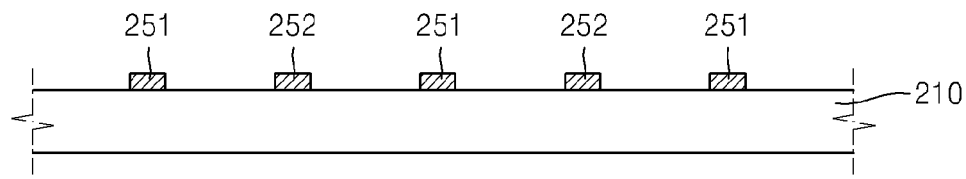
FIGS. 4 through 7 are cross-sectional views illustrating an embodiment of a method of manufacturing a color filter substrate.

Referring to FIG. 4, the first black matrices 251 and the second black matrices 252 are simultaneously formed on the second substrate 210. In some embodiments, the first black matrices 251 and the second black matrices 252 may be formed by forming a photosensitive organic material on the second substrate 210, to which a pigment such as carbon black is added, and patterning the photosensitive organic material through exposing and developing by using a mask. In other embodiments, the first black matrices 251 and the second black matrices 252 may be formed by using a black-based conductive material including chromium (Cr) or chromium oxide (CrO). The first black matrices 251 and the second black matrices 252 may be formed by forming a photosensitive film on Cr or CrO, patterning the photosensitive film through exposing and developing by using a mask, and etching Cr or CrO using the mask.

In some embodiments, the first black matrices 251 and the second black matrices 252 are simultaneously formed. In other embodiments, the first black matrices 251 may be formed and then the second black matrices 252 may be formed, and vice versa. The first black matrices 251 and the second black matrices 252 that are spaced apart from each other are alternately formed.

The first black matrices 251 and the second black matrices 252 are spaced apart from each other by a predetermined interval. The first black matrices 251 are formed in the pixel areas A and the second black matrices 252 are formed in areas other than the pixel areas A. The first black matrices 251 are disposed in the first holes 231 formed in the color filter 230 during a subsequent process. The second black matrices 252 are formed on the second substrate 210 to correspond to the gate lines 120, the date lines 130, and the TFT 160.

The first black matrices 251 increase visibility of a color realized in the corresponding pixel areas A. The second black matrices 252 prevent light leaking and, the second black matrices 252 formed at boundaries of the adjacent pixel areas A prevent light interference between the adjacent pixel areas A.

Figure 5:
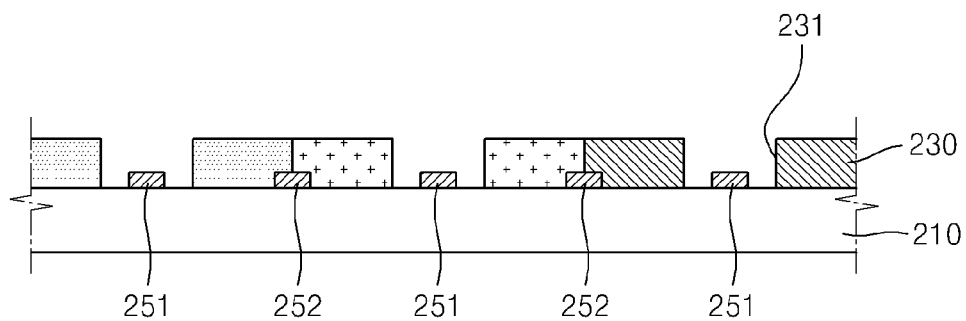

Referring to FIG. 5, red, green, and blue resists are sequentially coated on the second substrate 210 and are patterned to form the color filters 230. When the color filters 230 are patterned, the first holes 231 are formed in predetermined areas of the color filters 230 formed in the pixel areas A. The first holes 231 may be formed in the pixel areas A, formed to be disposed at the center of the color filters 230. The first holes 231 are formed so that the second substrate 210 is exposed. A mask to expose areas of the first holes 231 is used to perform exposing.

Figure 6:
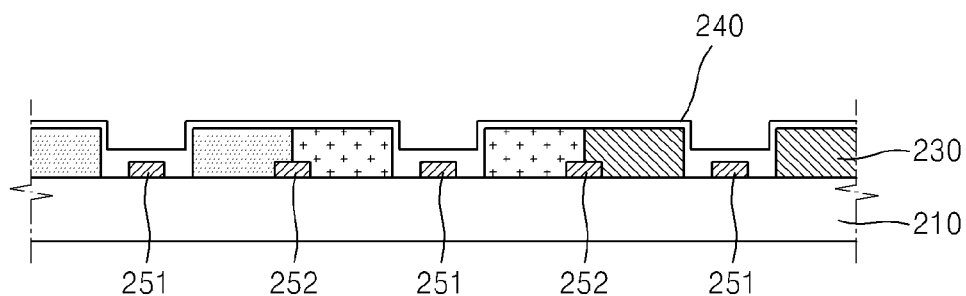

Referring to FIG. 6, the common electrode 240 is formed on the second substrate 210. The common electrode is a transparent conductive layer and may include ITO or IZO. The transparent conductive layer directly contacts the second substrate 210.

Figure 7:
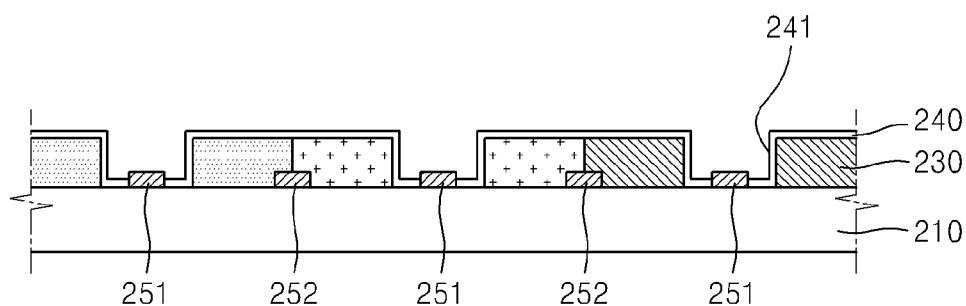

Referring to FIG. 7, the transparent conductive layer is patterned to form the second holes 241 in the common electrode 240. The second holes 241 of the common electrode 240 are formed to correspond to the first holes 231 of the color filters 230 and thus the first black matrices 251 are exposed through the first holes 231 and the second holes 241. The second holes 241 of the common electrode 240 may be formed by using, for example, etching. A mask used in etching may be patterned with the second holes 241 that are smaller than or the same as the first holes 231 so that a part of the common electrode 240 may maintain partial contact with the second substrate 210 in consideration of an etching margin of the common electrode 240.

The sizes of the first black matrices 251 may be larger than or the same as the second holes 241. If the sizes of the second holes 241 are larger than those of the first black matrices 251, a gap between the common electrode 240 and the first black matrices 251 is formed and thus operation of the liquid crystal layer (not illustrated) that is close to the gap may be adversely affected. Also, in order to not form a gap between the first black matrices 251 and the second holes 241, the sizes of the first black matrices 251 may be larger than or the same as the second holes 241.

Although the common electrode 240 is patterned to form the second holes 241 in the common electrode 240, the common electrode 240 as a transparent conductive layer surrounds the upper surfaces and sides of the color filters 230 and thus the color filters 230 are not damaged. Accordingly, a separate over coat film need not be formed to protect the color filters 230 so that a manufacturing cost may be reduced and a process of manufacturing the color filter substrate 200 may be simplified.

Figure 8:
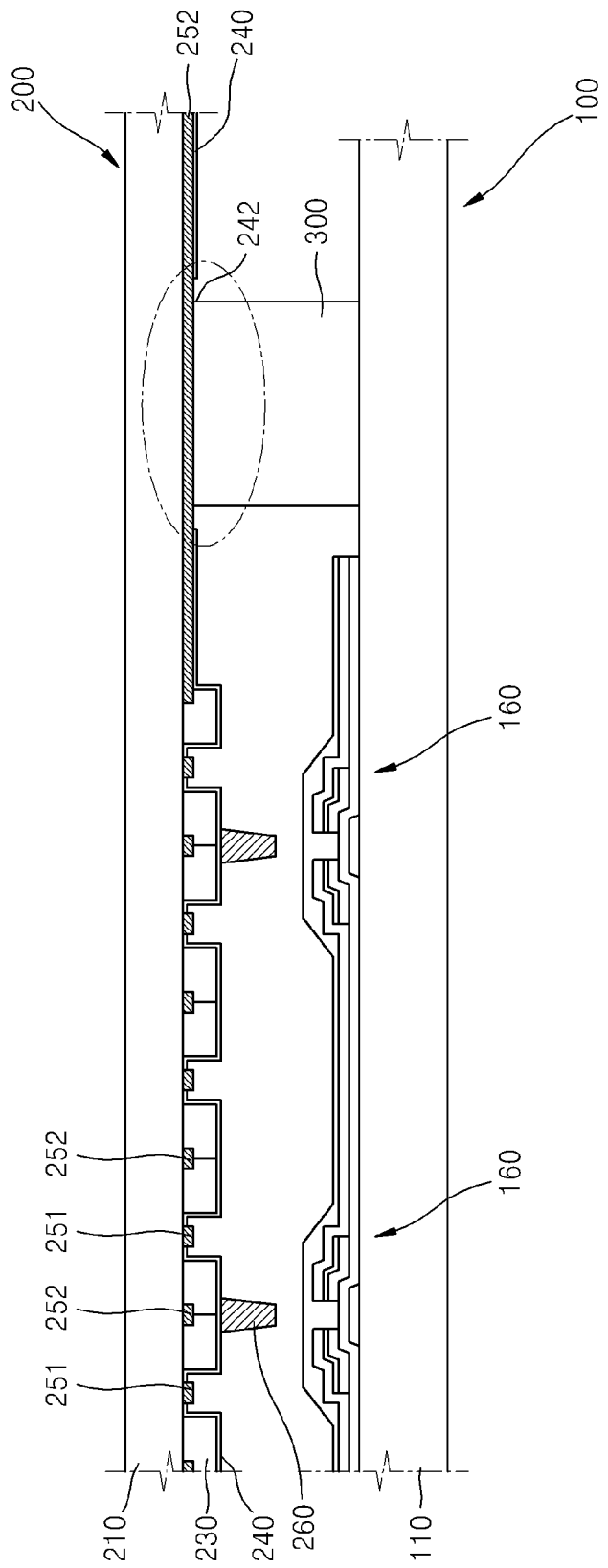
FIG. 8 is a cross-sectional view schematically illustrating another embodiment of a display panel.

FIG. 8 is a cross-sectional view schematically illustrating another embodiment of a display panel. Referring to FIG. 8, the display panel includes the TFT substrate 100, the color filter substrate 200, and a liquid crystal layer (not illustrated) interposed therebetween, as in the display panel of FIG. 1. The TFT substrate 100 and the color filter substrate 200 prevent the liquid crystal layer from leaking through the use of a sealing member 300. An opening 242 is further formed in the common electrode 240 of the color filter substrate 200 to correspond to the sealing member 300.

The opening 242 is formed by removing the area corresponding to the sealing member 300 when the common electrode 240 is patterned so that the sealing member 300 directly contacts the second black matrices 252. Since the sealing member 300 directly contacts the second black matrices 252, a peel strength between the filter substrate 200 and the TFT substrate 100 increases.

Column spacers 260 may be formed by forming a photosensitive film on the second substrate 210, including the common electrode 240, and performing exposing and developing.

As described above, embodiments of the display panel may be applied not only to a general mobile patterned vertical alignment (mPVA) mode liquid crystal display panel but also to a semi-transmission mPVA mode and pentile mPVA mode liquid crystal display panel.

According to certain embodiments, a process for forming an over coat film is omitted so that a process of manufacturing the display panel may be simplified and thereby manufacturing costs and time may be reduced.

As an over coat film is removed, defects caused in the over coat film, for example, protrusion defects and spots may be removed and thus a yield may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A color filter substrate comprising:
a substrate in which pixel areas are defined;
color filters formed on the pixel areas and comprising at least one first hole therein;
a common electrode surrounding upper surfaces and sides of the color filters and comprising at least one second hole to align with the at least one first hole;
a first black matrix formed in each of the first holes, wherein sides of the first black matrix contact only the common electrode; and
a second black matrix formed in areas adjacent to each of the pixel areas, wherein the second black matrix contacts the color filters formed on the pixel areas.

2. The color filter substrate of claim 1, wherein the at least one first hole is configured to expose the substrate.

3. The color filter substrate of claim 1, wherein there are a plurality of first holes and a plurality of second holes, and wherein each of the second holes are smaller than each of the first holes.

4. The color filter substrate of claim 1, wherein there are a plurality of first holes and a plurality of second holes, and wherein each of the second holes are the same size as each of the first holes.

5. The color filter substrate of claim 1, wherein there are a plurality of first holes and a plurality of second holes, and wherein each of the first black matrices are larger than each of the second holes.

6. The color filter substrate of claim 1, wherein the first black matrices are the same size as the second holes.

7. The color filter substrate of claim 1, wherein the pixel areas comprise a plurality of sub-pixel areas and the first holes are respectively formed in each of the plurality of sub-pixel areas.

8. The color filter substrate of claim 1, wherein the color filters each realize a different color and the second black matrices are formed between the color filters.

9. A display panel comprising:
a thin film transistor (TFT) substrate on which pixel electrodes and TFTs are formed;
a color filter substrate facing the TFT substrate configured to provide a space for a liquid crystal layer; and
a sealing member interposed between the TFT substrate and the color filter substrate configured to seal the liquid crystal layer,
wherein the color filter substrate comprises: a substrate in which pixel areas are defined; color filters formed on the pixel areas and comprising a plurality of first holes therein; a common electrode surrounding upper surfaces and sides of the color filters and comprising a plurality of second holes to align with the first holes; a plurality of first black matrices formed in the first holes, wherein sides of the first black matrices contact only the common electrode; and a plurality of second black matrices formed in respective areas adjacent to each of the pixel areas, wherein the second black matrices contact the respective color filters formed on the pixel areas.

10. The display panel of claim 9, wherein the first holes formed in the color filters are configured to expose the substrate.

11. The display panel of claim 9, wherein the color filters each realize a different color and wherein the second black matrices are formed between the color filters.

12. The display panel of claim 9, wherein the common electrode on the color filter substrate is opened to correspond to the sealing member.

13. The display panel of claim 9, further comprising column spacers to correspond to the TFTs on the TFT substrate, the column spacers configured to maintain a gap between the TFT substrate and the color filter substrate.

* * * * *